United States Patent [19]

Anderton

[11] Patent Number: 4,512,628
[45] Date of Patent: Apr. 23, 1985

[54] SPLICE CASING ASSEMBLY

[75] Inventor: John J. Anderton, Oil City, Pa.

[73] Assignee: GTE Products Corporation, Stamford, Conn.

[21] Appl. No.: 499,642

[22] Filed: May 31, 1983

[51] Int. Cl.³ .................................................. G02B 7/26
[52] U.S. Cl. .................................................... 350/96.20
[58] Field of Search ............... 350/96.15, 96.20, 96.21, 350/96.22

[56] References Cited

U.S. PATENT DOCUMENTS

| 4,332,435 | 6/1982 | Post | 350/96.20 |
| 4,359,262 | 11/1982 | Dolan | 350/96.20 |
| 4,428,645 | 1/1984 | Korbelak et al. | 350/96.20 |

Primary Examiner—John Lee
Attorney, Agent, or Firm—John A. Odozynski; William H. McNeill

[57] ABSTRACT

A splice casing assembly for an elongated splice housing assembly and associated fiber optic cables includes a mounting insert disposed within a substantially tubular casing. A particularized mounting insert is characterized by a rectangular platform portion for supporting the splice housing assembly and by disklike end portions for positioning the insert within the tubular casing. Each of a pair of casing plugs comprises a threaded portion for fastening the plug at an end of the tubular casing and a tapered portion into which a fiber optic connector is threaded. Each of the connectors, a pair are included, comprises a threaded portion, a hexagonal gripping portion, a major cylindrical portion, and a minor cylindrical portion disposed between the hexagonal gripping portion and the major cylindrical portion. The casing assembly is configured so that fiber optic cables, supported by the connectors, may be routed through the connector, through the plug casings and into the splice housing assembly.

16 Claims, 3 Drawing Figures

SPLICE CASING ASSEMBLY

TECHNICAL FIELD

This invention relates to connecting apparatus for optical fibers and more particularly to a tubular splice casing assembly that provides a unified structural arrangement for a pair of fiber optic cables comprising multiple optical fibers mated via elongated splice housing assemblies.

BACKGROUND OF THE INVENTION

There are many advantages to transmitting light energy via optical fiber waveguides and the use thereof is diverse. Single or multiple fiber waveguides may be used simply for transmitting light to a remote location. Complex communication systems may transmit multiple specific optical signals. These devices often require the coupling of fibers in end-to-end relationship. The coupling is a source of light loss with axial misalignment representing a particularly serious problem. Other factors causing signal loss are angular misalignment of fibers, longitudinal separation of fiber ends and reflection or refraction at the fiber ends.

When placing optical fibers in end-to-end relationship in order to minimize light loss, it is desirable to have a rugged splice that can be simply and reliably used in field installations. The junctioned fibers should be protected from environmental factors and be securely held in place.

The following patents relate to various fiber optic connectors: U.S. Pat. No. 3,922,064 to Clark et al., U.S. Pat. No. 3,990,779 to McCartney, U.S. Pat. No. 4,050,783 to Tardy, U.S. Pat. No. 4,050,781 to Beauhaire, U.S. Pat. No. 4,097,129 to Wellington et al., and U.S. Pat. No. 4,146,299 to Wellington et al.

In addition, once two or more optical fibers have been successfully joined by virtue of an appropriate splice, it remains necessary to enclose the splice in a suitable housing in order to, inter alia, provide the splice with a degree of protection from the surrounding environment. To that end, U.S. patent application Ser. No. 396,522, by the same inventor as this application, filed July 8, 1982, discloses a splice housing assembly suitable for the enclosure of a splice such as described in U.S. Pat. No. 4,257,674 to Griffin et al.

In particular, the splice housing assembly disclosed therein includes an elongated, generally canoe-shaped housing including a complementary cover. The cover is adapted to be secured to the housing via the operation of a plurality of pendant prong members. The housing exhibits a centrally-positioned trough for the placement and retention of the fiber optic ferrule splice. Positioned at ends of the housing are a pair of upwardly extending flange members through which jacketed fiber optic cables may be dressed and afforded strain relief. The housing also exhibits a pair of rectangular channels disposed on opposite sides of the centrally-positioned trough, intermediate the trough and respective ends of the housing. The channels accommodate respective slideable members which serve to effect efficient optical coupling of fibers inserted at opposite ends of the housing in the direction of the ferrule splice. In order to effect coupling of a pair of optical fibers, an individual fiber is routed through the flange members at opposite ends of the housing and through an axially-aligned passageway in an associated slidable member.

The slideable member includes a camming mechanism that allows insertion of the glass fiber when the camming member is in the open position. Once the fiber has been successfully inserted, the camming mechanism is actuated so as to fixedly position the fiber with reference to the slideable member. At this point the jacket of the fiber may be removed, thereby exposing an appropriate length of fiber core. The slideable members are then urged toward the splice and the fibers permitted to penetrate the splice so as to tend toward abutment, thereby bringing about the desired optical coupling between fibers.

Upon completion of a splicing operation as outlined above via the heretofore described splice housing assembly, it is regularly desired to further protect and ruggedize fiber-splice-housing assemblies. Furthermore, it may be expected that an optical fiber cable comprise a plurality of individual glass fibers and that pairs of fibers from opposite cables need be mated via individual splice-housing apparatus. Accordingly, the subject invention is directed to a splice casing assembly for one or more splice housing assemblies.

DISCLOSURE OF THE INVENTION

The above and other objects, advantages and capabilities are achieved in one aspect of the invention by a splice casing assembly for a fiber optic splice assembly and accommodated mating fiber optic cables. The casing assembly comprises an elongated mounting insert for supporting the splice assembly, the mounting insert disposed within a substantially tubular casing. A pair of casing plugs are fastened at ends of the tubular casing and a pair of fiber optic connectors are fastened in turn to the plugs. The connectors are designed to support fiber optic cables routed through the connectors and through the casing plugs and into a housing of the splice assembly.

The casing assembly provides enhanced protection for and ruggedization of the splice assembly and is designed to accommodate more than one splice assembly and more than one associated pair of mating optical fibers.

DESCRIPTION OF A REFERRED EMBODIMENT

Figure 1A:
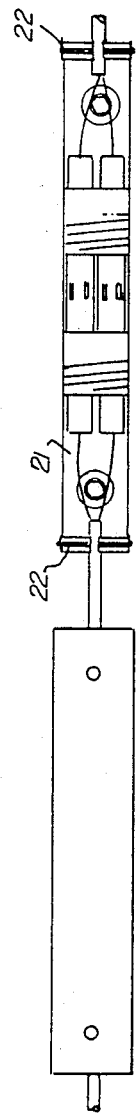
FIGS. 1A and 1B are exploded top and side views of a splice casing assembly incorporating the subject mounting insert.
Figure 1B:
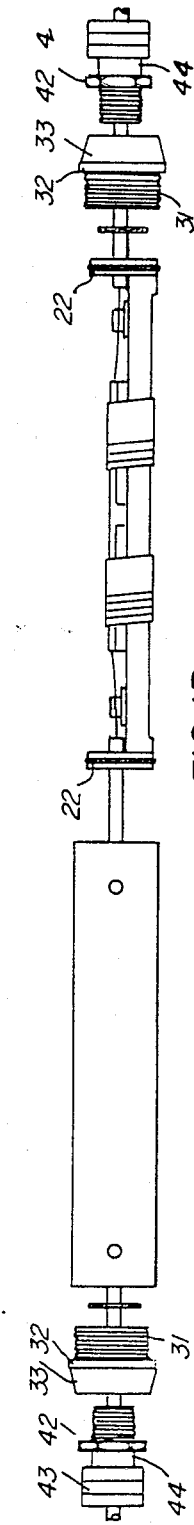

Referring now to FIGS. 1A and 1B, the subject splice casing assembly is seen to include an elongated mounting insert 2 for supporting one or more splice housing assemblies 9, the splice housing assemblies generally of a configuration as described above. The housing assemblies may be fixed to and positioned on the insert through the use of tape shown as element 11 in FIG. 1B. The mounting insert, designed to be disposed within a tubular splice casing 1, is comprised of an elongated, substantially rectangular platform portion 21 and integral disklike portions 22 disposed at opposite ends of the platform portion. The disklike portions exhibit radially-extending slots or apertures for the accommodation of cladded fiber optic cables 13 as well as the insertion of dowels (to be described below). In particular, the apertures extend from a central point toward their circumference so as to allow axial insertion of the cables. The mounting insert also includes a pair of cap screws 8 and associated washers 10 positioned somewhat inwardly from disklike portions 22. The respective cap screws and washers provide a mechanism for retention of cable strength members. The platform portion is configured so as to complement the outline of the splice housing assembly and the disklike portions are configured so as to fit into the tubular splice casing. To this end, the disklike portions are surrounded by polyurethane "0"-rings 6 so as to facilitate a snug fit of the mounting insert with the splice casing. The substantially tubular splice casing, which may be fabricated from black anodized aluminum, exhibits a pair of circular bores for the insertion of dowels 12, the dowels to be aligned with the apertures in disklike portions 22 so as to prevent rotation of the platform portion within the casing.

The mounting insert is secured within the casing via a pair of casing plugs 3, the casing plugs to be fastened at opposite ends of the casing. The casing plugs comprise a threaded portion 31 for mating into the casing. The threaded portion is characterized by an axial length such that the total length of the threaded portions of the two plugs plus the length of the insert is approximately equal to the length of the casing. As a result, when the insert is positioned in the casing, between the two casing plugs, and the plugs are in turn threaded into the ends of the casing, the insert fits securely in the casing and the ends of the casing abut respective intermediate portions 32 of the casing plugs. The intermediate portions are accordingly dimensioned so as to have a diameter larger than the diameter of the threaded portions and approximately equal to the outer diameter of the casing. The casing plugs also exhibit respective tapered portions 33 which narrow in a direction away from the threaded and intermediate portions. A second pair of polyurethane "0"-rings 5 positioned between disklike portions 22 and threaded portions 31, facilitate the abutment of the mounting insert with the casing plugs and provide an environmental seal for the splice casing assembly. A third pair of "0"-rings 7, positioned over the threaded portion 31 toward the intermediate portion 32 perform a substantially similar function.

Finally, the casing assembly shown in FIGS. 1A and 1B includes a pair of fiber optic connectors 4, each of the connectors adapted to be individually fastened at a respective end of an associated casing plug. To wit: the connectors comprise threaded portions 41 designed to be threaded into the tapered portions of the casing plugs. The connectors also comprise polygonal, e.g., octagonal, gripping portion 42 designed to facilitate the threading operation, a major cylindrical portion 43 disposed at an end of the connector remote from the threaded portion, and a minor cylindrical portion 44 disposed between the gripping and major cylindrical portions.

Figure 2:
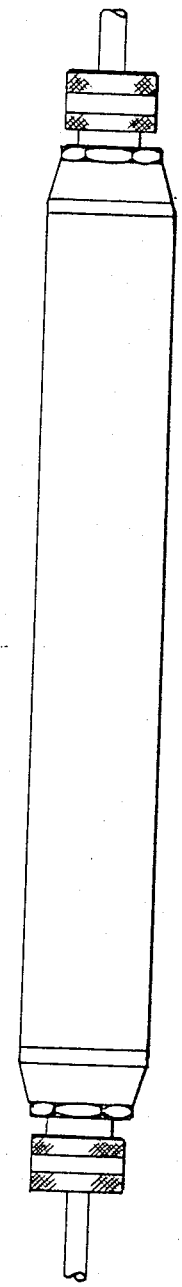
FIG. 2 shows an assembled splice casing.

A completely assembled splice casing assembly is shown in FIG. 2. As can be seen from that figure in conjunction with FIG. 1, each of a pair of fiber optic cables is routed in a mating fashion via an associated connector, through a casing plug and a disklike portion of the mounting insert. The cable is secured and afforded strain relief via a cap screw and washer. Individual glass fibers (Each cable is shown as comprising two fibers in FIG. 1) are inserted into a respective associated splice assembly where the splicing operation is perfected. The casing plugs are then threaded into opposite ends of the tubular casing and the connectors threaded in turn into the plugs.

The splice casing assembly, as shown in FIG. 2 provides enhanced protection for and ruggedization of the splice assembly. In addition, the casing assembly is designed to accommodate mating fiber optic cables, the individual cables comprising one or more glass fibers.

Accordingly, while there has been shown and described what is at present considered a preferred embodiment of a fiber optic splice casing assembly, it will be obvious to those skilled in the art that various changes and modifications may be made therein without departing from the scope of the invention as defined by the appended claims.

INDUSTRIAL APPLICABILITY

The invention is useful in equipment using optic fibers for information transmission and delivery.

What is claimed is:

1. A splice casing assembly for a fiber optic splice housing assembly, the casing assembly comprising:
    a tubular splice casing,
    an elongated mounting insert disposed within the casing and for supporting a splice housing assembly,
    a pair of casing plugs, each individually fastened at an opposite end of the tubular casing, and
    a pair of connectors for fiber optic cables, each of the connectors individually fastened at a respective end of an associated casing plug, whereby each of a pair of fiber optic cables may be routed in a mating fashion via an associated connector, through an associated casing plug and into an end of the fiber optic splice housing assembly, said splice housing assembly to be surrounded by the tubular casing.

2. A splice casing assembly as defined in claim 1 wherein the mounting insert is comprised of an elongated, rectangular platform portion and integral disklike portions disposed at opposite ends of the platform portion.

3. A splice casing assembly as defined in claim 2 wherein the disklike portions exhibit central apertures for the axial insertion of a fiber optic cable.

4. A splice casing assembly as defined in claim 1 wherein the casing plugs each comprise a threaded portion for fastening to the splice casing.

5. A splice casing assempy as defined in claim 4 wherein the casing plugs each comprise a tapered portion narrowing in a direction away from the threaded portion.

6. A splice casing assembly as defined in claim 5 wherein each of the casing plugs comprises an intermediate portion disposed between the threaded portion and the tapered portion, said intermediate portion characterized by a diameter larger than the diameter of the threaded portion.

7. A splice casing assembly as defined in claim 6 wherein each of the casing plugs further comprises an aperture for the insertion of a fiber optic cable.

8. A splice casing assembly as defined in claim 1 wherein each of the connectors comprises a threaded portion for fastening to the casing plugs, a polygonal gripping portion, a major cylindrical portion, and a minor cylindrical portion disposed between the polygonal gripping portion and the major cylindrical portion.

9. A splice casing assembly as defined in claim 8 wherein each of the connectors exhibits an aperture for the insertion of a fiber optic cable.

10. A splice casing assembly for a fiber optic splice housing assembly, the casing assembly comprising:

a tubular splice casing, a mounting insert disposed within the splice casing and for supporting a splice housing assembly, the mounting insert comprising an elongated, rectangular platform portion and integral disklike portions disposed at opposite ends of the platform portion, a pair of casing plugs, each individually fastened at an opposite end of the splice casing, said casing plugs each comprising a threaded portion for fastening to the splice casing, and a pair of connectors for fiber optic cables, each of the pair individually fastened at a respective end of a casing plug and comprising a threaded portion for fastening to the casing plug, a polygonal gripping portion, a major cylindrical portion, and a minor cylindrical portion disposed between the polygonal gripping portion and the major cylindrical portion, whereby each of a pair of fiber optic cables may be routed in a mating fashion via an associated connector, through an associated casing plug and into an end of the fiber optic splice housing assembly, said splice housing assembly to be surrounded by the tubular casing.

11. A splice casing assembly as defined in claim 10 wherein each of the disklike portions exhibits a central aperture for the axial insertion of a fiber optic cable.

12. A splice casing assembly as defined in claim 10 wherein each of the casing plugs comprises a tapered portion narrowing in a direction away from the threaded portion.

13. A splice casing assembly as defined in claim 12 wherein each of the casing plugs comprises an intermediate portion disposed between the threaded portion and the tapered portion, said intermediate portion characterized by a diameter larger than the diameter of the threaded portion.

14. A splice casing assembly as defined in claim 10 wherein each of the connectors exhibits an aperture for the insertion of a fiber optic cable.

15. A splice casing assembly as defined in claim 14 wherein each of the casing plugs comprises a tapered portion narrowing in a direction away from the threaded portion.

16. A splice casing assembly as defined in claim 15 wherein each of the casing plugs comprises an intermediate portion disposed between the threaded portion and the tapered portion, said intermediate portion characterized by a diameter larger than the diameter of the threaded portion.

* * * * *